(12) United States Patent
Del Solar et al.

(10) Patent No.: US 8,746,486 B2
(45) Date of Patent: Jun. 10, 2014

(54) BOWL WITH LID

(75) Inventors: Maria Alexandra Del Solar, Stamford, CT (US); Paul Maguire, Goochland, VA (US); Au Kin Fo Bryan, Kowloon (HK)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 13/447,838

(22) Filed: Apr. 16, 2012

(65) Prior Publication Data

US 2013/0098915 A1 Apr. 25, 2013

Related U.S. Application Data

(60) Provisional application No. 61/475,759, filed on Apr. 15, 2011.

(51) Int. Cl.
| | | |
|---|---|---|
| *B65D 41/00* | (2006.01) | |
| *B65D 41/04* | (2006.01) | |
| *B65D 41/06* | (2006.01) | |
| *B65D 43/00* | (2006.01) | |

(52) U.S. Cl.
USPC ........... 220/293; 220/296; 220/298; 220/301; 215/230

(58) Field of Classification Search
USPC ......... 220/288, 290, 293, 296, 298, 301, 780, 220/784, 793; 215/230, 272, 293
See application file for complete search history.

(56) References Cited

U.S. PATENT DOCUMENTS

| | | |
|---|---|---|
| 2,434,611 A | 1/1948 | Hamiel |
| D193,638 S | 9/1962 | Goldstein et al. |
| 3,139,064 A | 6/1964 | Jean-Louis |
| 3,232,466 A | 2/1966 | Fuad |
| D216,096 S | 11/1969 | Lawton |
| D220,560 S | 4/1971 | Johnson |
| 3,741,421 A | 6/1973 | Wittwer |
| 3,757,979 A | 9/1973 | Berghahn |
| 4,289,248 A | 9/1981 | Lynn |
| 4,471,880 A | 9/1984 | Taylor et al. |
| D280,289 S | 8/1985 | Aldrich et al. |
| 4,664,273 A | 5/1987 | Simon |
| 4,723,673 A | 2/1988 | Tartaglia et al. |
| 4,770,308 A * | 9/1988 | Lynn .......................... 215/330 |
| 4,809,868 A | 3/1989 | Pomroy |
| 4,884,717 A | 12/1989 | Bussard et al. |

(Continued)

FOREIGN PATENT DOCUMENTS

| | | |
|---|---|---|
| EP | EM000062906-0001 | 8/2003 |
| JP | D1317658 | 11/2007 |

(Continued)

OTHER PUBLICATIONS

International Search Report and Written Opinion Dated July 2, 2012 From PCT Application No. PCT/US2012/033772.

(Continued)

*Primary Examiner* — Anthony Stashick
*Assistant Examiner* — Madison L Poos
(74) *Attorney, Agent, or Firm* — EnergizerPersonal Care, LLC

(57) ABSTRACT

A food storage container includes a bowl that connects to a lid in a closed position. Upon movement of the bowl and lid into the closed position, an audible sound or signal is generated as well as visual and tactile indications.

25 Claims, 11 Drawing Sheets

(56) References Cited

U.S. PATENT DOCUMENTS

| | | | |
|---|---|---|---|
| D307,238 S | 4/1990 | May | |
| 5,009,338 A * | 4/1991 | Barker | 215/230 |
| D322,224 S | 12/1991 | Miner | |
| D330,860 S | 11/1992 | Gatrost | |
| 5,186,344 A | 2/1993 | Cook | |
| 5,292,017 A | 3/1994 | Reifers | |
| 5,617,968 A | 4/1997 | Luburic | |
| D381,042 S | 7/1997 | Roche | |
| 5,938,054 A | 8/1999 | Loader | |
| 5,971,154 A | 10/1999 | Toren | |
| 5,988,412 A | 11/1999 | Minnette et al. | |
| D428,813 S | 8/2000 | Haley | |
| 6,431,380 B1 | 8/2002 | Branson | |
| D465,971 S | 11/2002 | Renz | |
| D471,110 S | 3/2003 | Booth et al. | |
| D471,458 S | 3/2003 | Booth et al. | |
| D483,611 S | 12/2003 | Ghanem | |
| 6,656,514 B1 | 12/2003 | Tubbs | |
| 6,758,358 B1 | 7/2004 | Bloom | |
| 6,883,672 B2 | 4/2005 | Dunn et al. | |
| D508,188 S | 8/2005 | Zettle et al. | |
| D514,942 S | 2/2006 | Weber | |
| 7,021,486 B1 | 4/2006 | Hurlbut | |
| 7,040,497 B2 | 5/2006 | Weiler et al. | |
| D539,098 S | 3/2007 | Tucker et al. | |
| D559,112 S | 1/2008 | Hyde et al. | |
| 7,331,479 B2 | 2/2008 | Oh | |
| D582,723 S | 12/2008 | Renz et al. | |
| D583,240 S | 12/2008 | Bourne | |
| D583,671 S | 12/2008 | Bourne | |
| D606,873 S | 12/2009 | Fischer | |
| D612,250 S | 3/2010 | Shah | |
| 7,766,166 B2 | 8/2010 | Dotta | |
| 8,403,160 B2 * | 3/2013 | Hentzel | 215/331 |
| 2005/0263523 A1 | 12/2005 | Moss | |
| 2008/0110850 A1 | 5/2008 | Tilton | |
| 2008/0116202 A1 | 5/2008 | Auer et al. | |
| 2009/0242562 A1 | 10/2009 | Valderrama et al. | |
| 2012/0228298 A1 * | 9/2012 | Cronin et al. | 220/290 |

FOREIGN PATENT DOCUMENTS

| | | |
|---|---|---|
| JP | D1316442 | 12/2007 |
| TW | 325357 | 1/1998 |
| TW | D100383 | 1/2008 |

OTHER PUBLICATIONS http://abbottnutrition.com/Products/similac-simply-smart, Similac Simply Smart, Abbott Nutrition for Healthcare Professionals 2011 (2 pages).

http://similac.com/baby-formula/baby-bottle, New Similac SimplySmart baby bottle, 2011 (3 pages).

Search Report Jun. 1, 1998 from corresponding Taiwanese Patent Application No. 098303502.

International Search Report and Written Opinion dated Jul. 20, 2009 from corresponding PCT Application No. PCT/US2009/001994.

Munchkin Snack Catcher—first used in Commerce Sep. 30, 2006.

International Preliminary Report on Patentability Dated Apr. 4, 2013 From PCT Application No. PCT/US2012/033772.

* cited by examiner

BOWL WITH LID

CROSS REFERENCE TO RELATED PATENT APPLICATIONS

This application claims the benefit of U.S. Provisional Application No. 61/475,759, filed Apr. 15, 2011. The contents of U.S. Provisional Application No. 61/475,759, filed Apr. 15, 2011, are hereby incorporated herein by reference in their entirety.

BACKGROUND OF THE DISCLOSURE

1. Field of the Disclosure

The present disclosure relates to food storage. Particularly, the present disclosure relates to a food storage container having a bowl that connects to a lid and provides at least one of an audible, visual, and tactile indication to a user that the lid is properly sealed or attached to the bowl.

2. Description of the Related Art

Care for children requires transport and storage of food. Food containers may have a bowl with an opening to insert food for storage in the bowl, which opening is then closed or covered by a lid. Current food containers in the market are not able to indicate to a user if the food container has been properly sealed and, thus, is free from spilling once the lid is closed. Unwanted spills and leaks occur during transportation or when the bowl accidentally falls sideways during storage.

Accordingly, there is a need for a storage container, preferably ergonomic, that provides a user with at least one of an audible, visual, and tactile signal when the food storage container is securely sealed, which makes for a practical and secure food storage container that can be used on the go or at home.

SUMMARY OF THE DISCLOSURE

There is provided a food storage container that has a bowl and a lid that connects to the bowl when in a sealed or closed position. Upon movement of the bowl and lid into the closed position, at least one of an audible, visual, and tactile signal is generated, indicating to the user that the lid is securely and properly sealed onto the bowl.

The above-described and other features and advantages of the present disclosure will be appreciated and understood by those skilled in the art from the following detailed description, drawings, and appended claims.

DESCRIPTION OF THE PREFERRED EMBODIMENT

Figure 1:
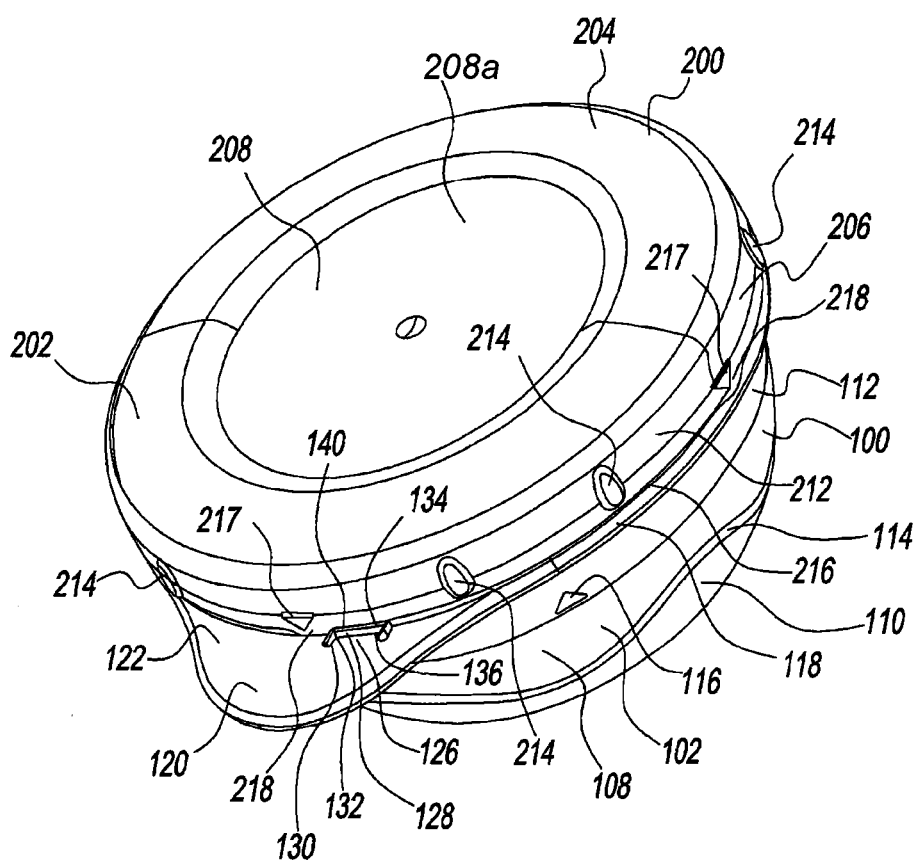
FIG. 1 is a top side perspective view of an exemplary embodiment of a bowl connected to a lid of the present disclosure.
Figure 2:
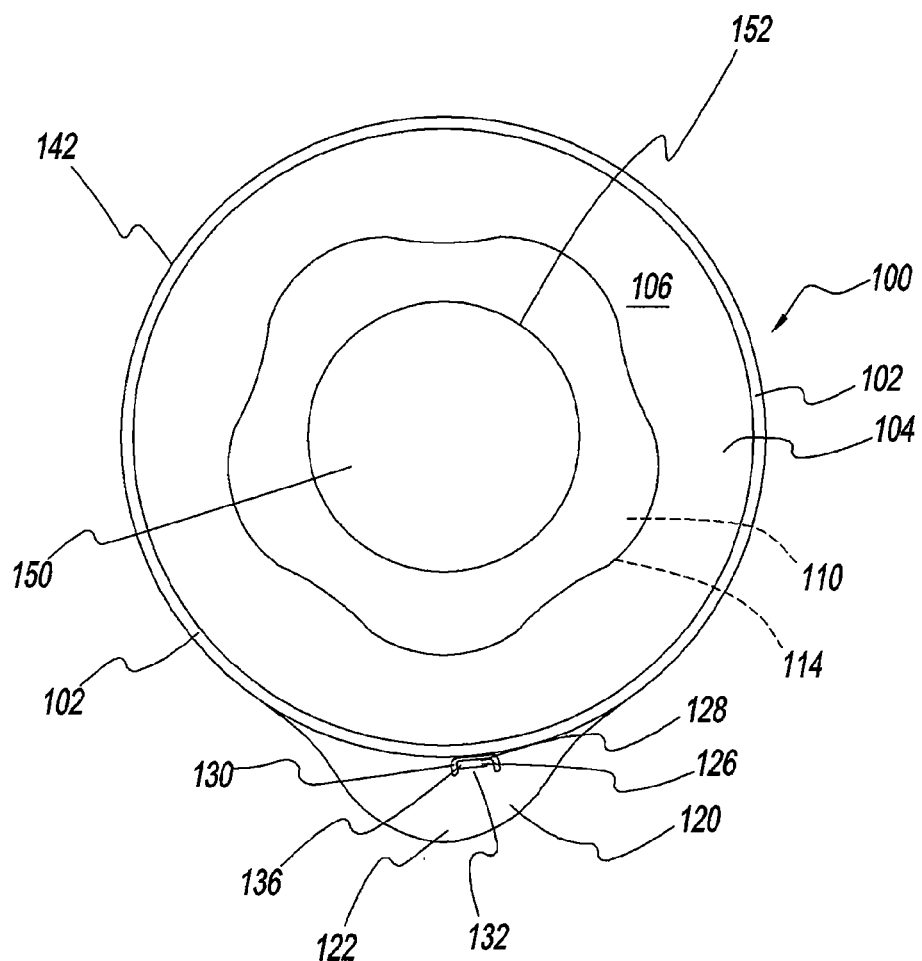
FIG. 2 is a top plan view of the bowl of FIG. 1.

Referring to the drawings and, in particular, FIG. 1, an exemplary embodiment of a bowl 100 connected to a lid 200 according to the present disclosure is shown. Bowl 100 has a bowl wall 102. Bowl wall 102 has a convex shape, or chamfered hemisphere, to form, as shown in FIG. 2, an interior volume 104. Bowl 100 and lid 200, for example, are each made of plastic, such as polypropylene.

Referring to FIG. 2, bowl wall 102 has an inner surface 106 facing interior volume 104 and, as shown in FIG. 1, an outer surface 108 opposite interior volume 104. Bowl wall 102 has a bottom portion 110 that has a thickness greater than a middle portion 112 so that bottom portion 110 protrudes from middle portion 112. Bottom portion 110 may have a shape of a wave 114. Inner surface 106 is smooth. Inner surface 106 (not shown on FIG. 1) has a smooth curve 152 (not shown on FIG. 1) forming dome shape portion 150. Outer surface 108 has an indicator 116. Indicator 116, for example, has a shape of a triangle or arrowhead protruding from bowl wall 102.

Figure 3:
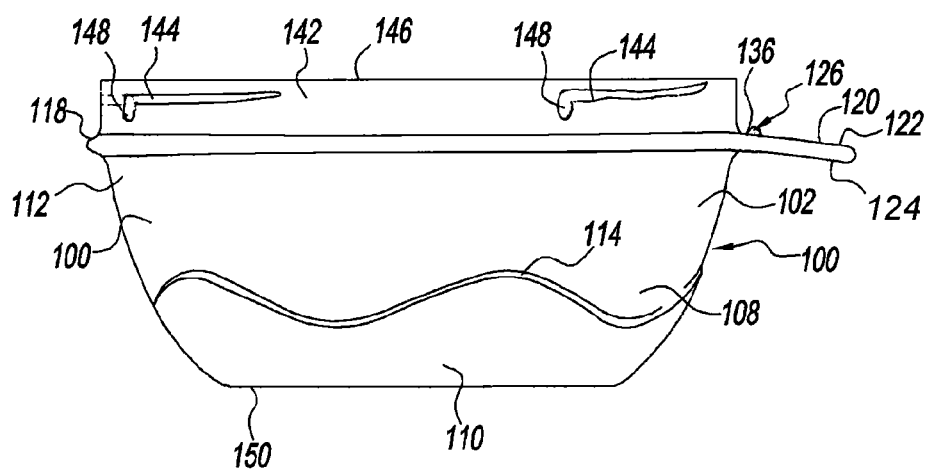
FIG. 3 is a side plan view of the bowl of FIG. 1.

Bowl wall 102 forms a rim 118 that is perpendicular to middle portion 112 of bowl wall 102. Rim 118 has a tongue 120 that protrudes from a remainder of rim 118. Tongue 120 bends downward toward bottom portion 110. Tongue 120 has a top surface 122 and a bottom surface 124, as shown in FIG. 3.

Figure 9:
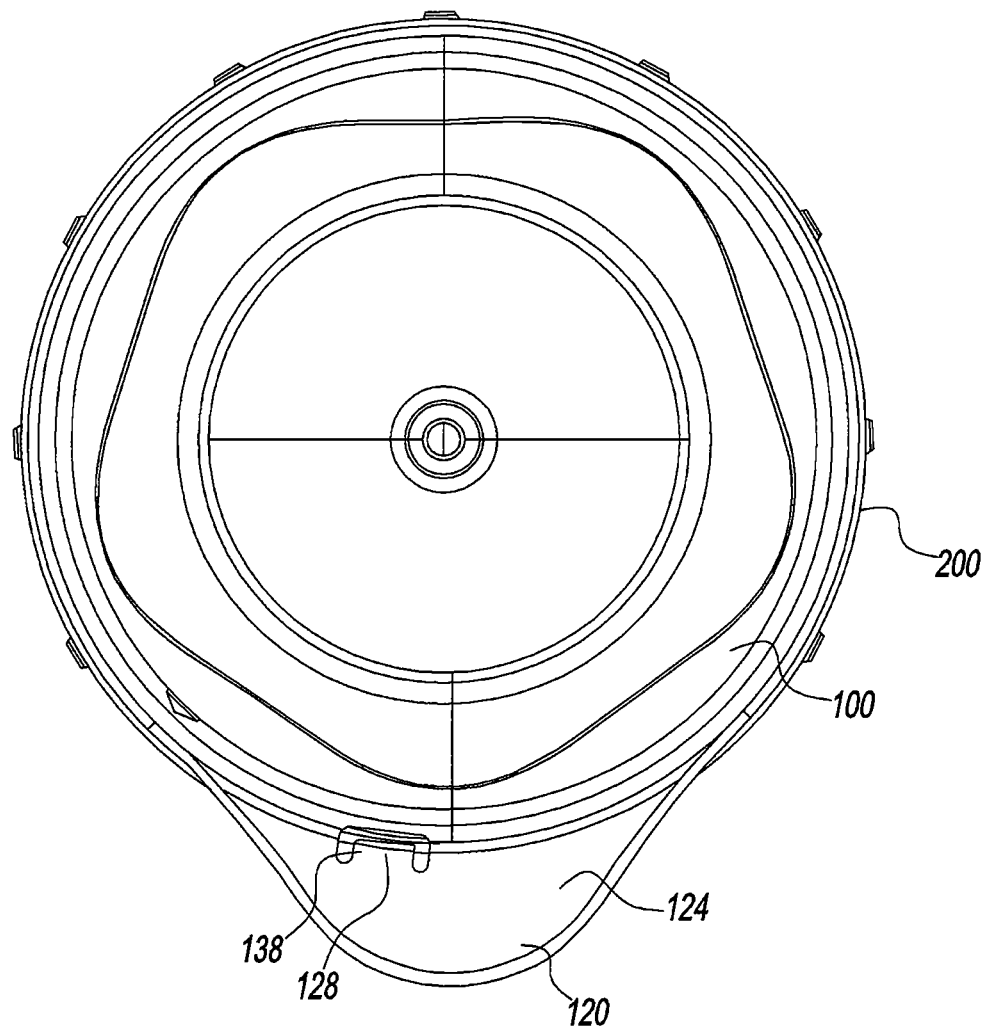
FIG. 9 is a bottom plan view of the bowl connected to the lid of FIG. 1.
Figure 10:
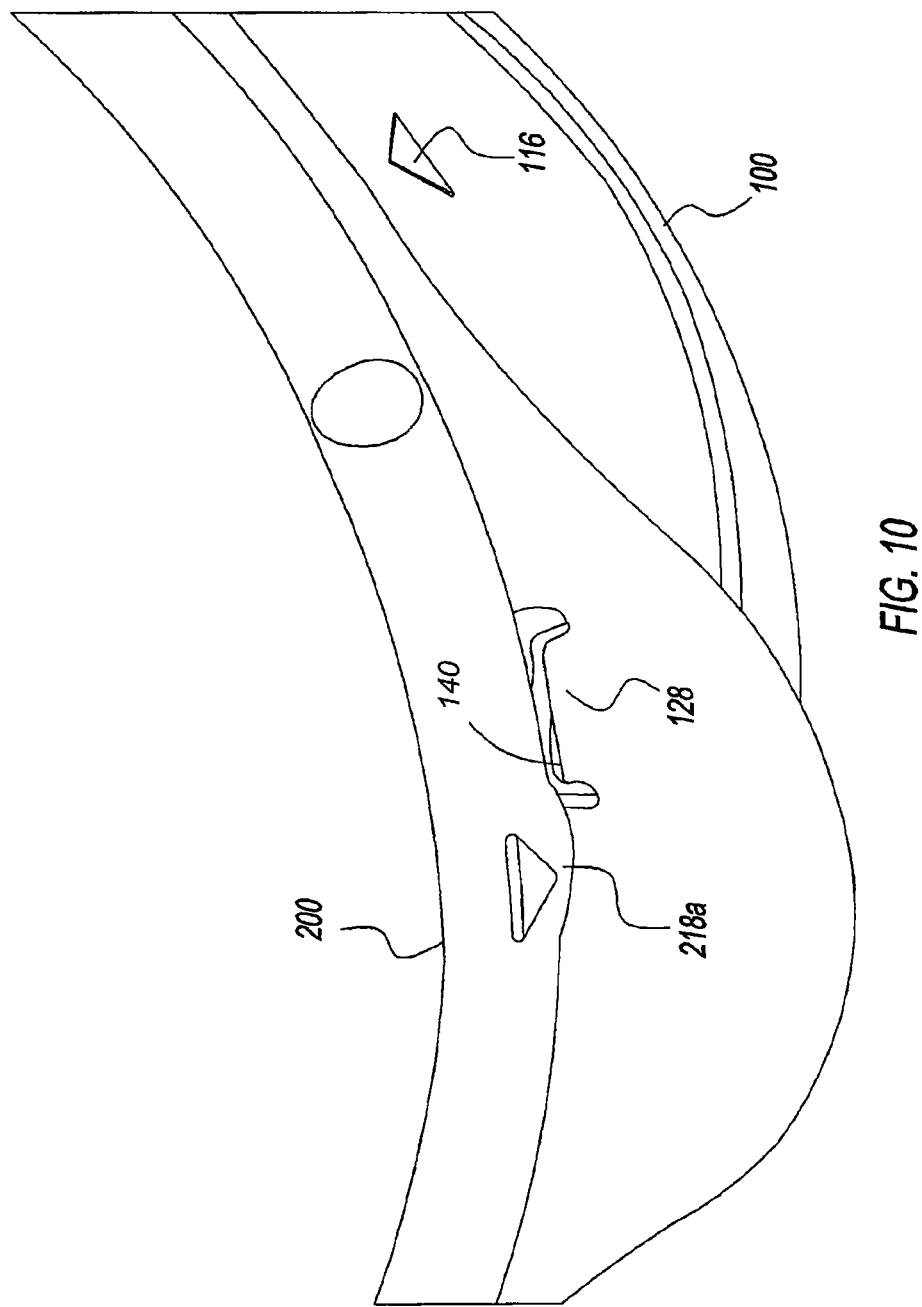
FIG. 10 is a partial top side perspective view of the bowl connected to the lid of FIG. 1.

Referring to FIG. 1, tongue 120 has a connector 126. Connector 126 has a tab 128 that is cantilevered within an aperture 130 through tongue 120. Tab 128 has a first side 132 that connects to tongue 120 and a second side 134 opposite first side 132 that is free. Tab 128 has a top surface 136 and, as shown in FIG. 9, a bottom surface 138. Top surface 136 has a ramp 140 that protrudes therefrom.

Lid 200 has lid wall 202. Lid wall 202 has a top wall 204 and a side wall 206 that forms a curve with top wall 204 so that it is perpendicular thereto. Top wall 204 has an indentation 208. Indentation 208 has, for example, a circular shape that is sized complimentary to bottom of bowl 100 to align with another bowl having the same shape as bowl 100 to allow stacking of bowls when lid 200 is connected to bowl 100. Middle portion 208a may have a disk like window (not shown) that is hinged to middle portion 208a. The disk is imbedded within lid wall 202 when closed without causing a surface that protrudes outwards. The disk like window protects a label that can be inserted therein.

Figure 6:
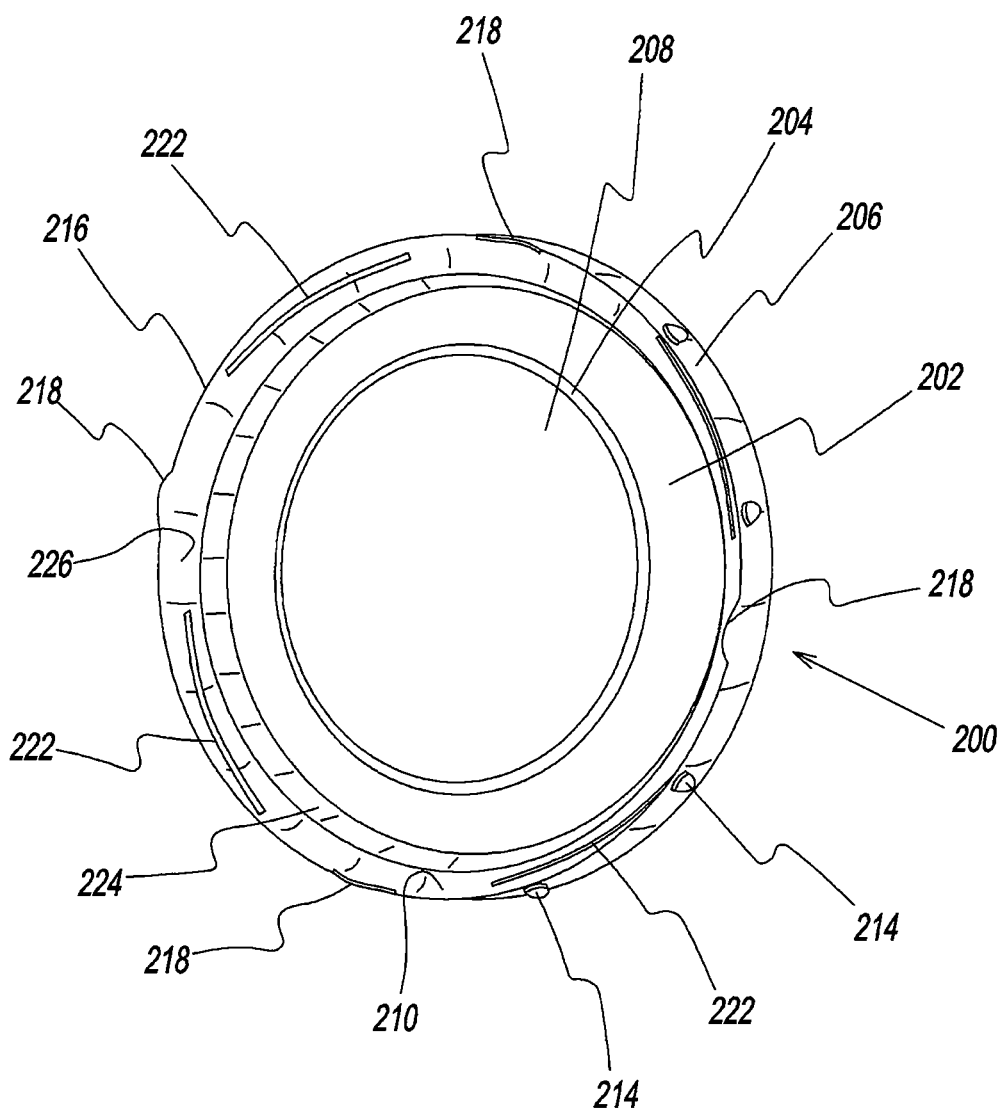
FIG. 6 is bottom side perspective view of the lid of FIG. 1.

As shown in FIG. 1, side wall 206 has an exterior surface 212 and an interior surface 210 opposite exterior surface 212, as shown in FIG. 6. Referring to FIG. 6, exterior surface 212 has grippers 214 that protrude from lid wall 202. Grippers 214 facilitate gripping for moving or rotating lid 200 by hands of a user. Side wall 206 has an edge 216 between interior surface 210 and exterior surface 212. Protrusions 218 protrude from edge 216. Protrusions 218 have a shape, for example, of a hemisphere. Each protrusion 218 may have a triangle or arrowhead 217 that protrudes from exterior surface 212. The arrowhead has an apex that is in protrusion 218.

Referring to FIG. 3, bowl wall 102 has a top portion 142 on a side of rim 118 opposite middle portion 112. Top portion 142 has bowl threads 144 on outer surface 108. Each bowl thread 144 slants from a top edge 146 towards rim 118 and has a stop 148 at an end of each thread 144 closest to rim 118. Stop 148 is a protrusion that extends from thread 144 towards rim 118. Bowl wall 102 has a dome shape portion 150 to rest bowl 100 on a surface.

Figure 4:
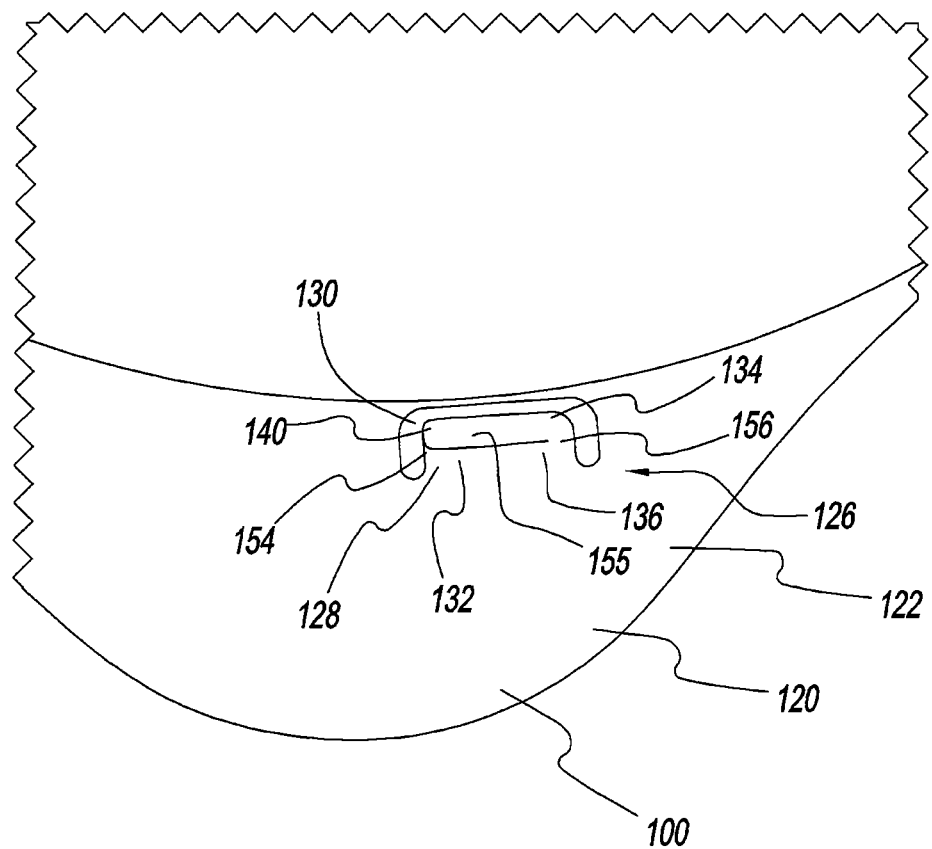
FIG. 4 is an enlarged partial top view of the bowl of FIG. 1.

Referring to FIG. 4, connector 126 has tab 128 that is cantilevered within aperture 130 through tongue 120. Aperture 130 is U-shaped. Tab 128 has first side 132 that connects to tongue 120 and second side 134 opposite first side 132 that is free. Tab 128 has top surface 136 that has ramp 140 that protrudes therefrom. Tab 128 has a third side 154 and a fourth side 156 opposite third side 154. Ramp 140 increases in height, as measured from top surface 136 of tab 128 to a top surface 155 of ramp 140, from fourth side 156 to third side 154.

Figure 5:
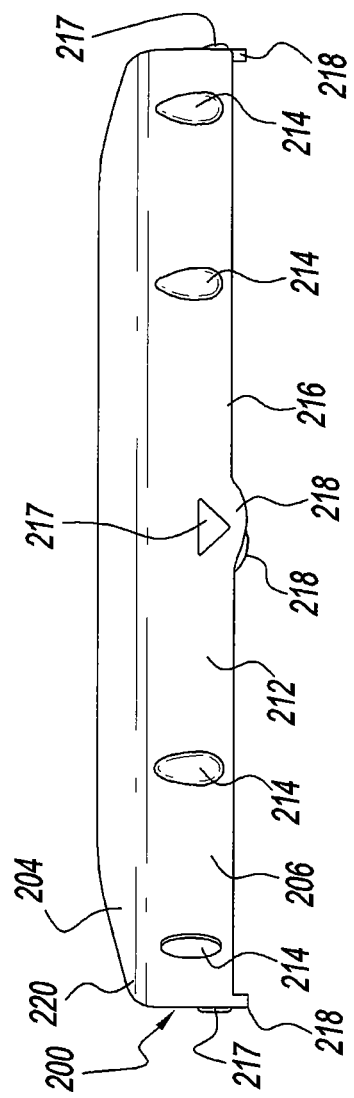
FIG. 5 is side plan view of the lid of FIG. 1.

Referring to FIG. 5, top wall 204 forms a curved portion 220 with side wall 206. Edge 216 may have four protrusions 218 spaced around a circumference thereof.

Referring to FIG. 6, interior surface 210 of lid 200 has lid threads 222. Lid threads 222 protrude from interior surface 210. Lid threads 222 are straight and slightly slanted towards edge 216. Lid 200 has an inner wall 224 parallel to side wall 206 having a space 226 therebetween.

Figure 7:
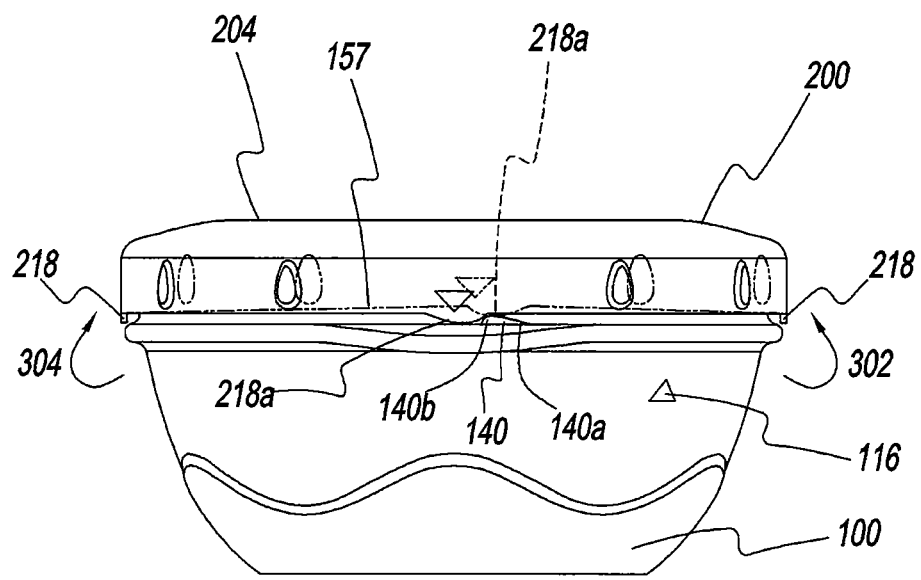
FIG. 7 is a front plan view of the bowl connected to the lid of FIG. 1.
Figure 8:
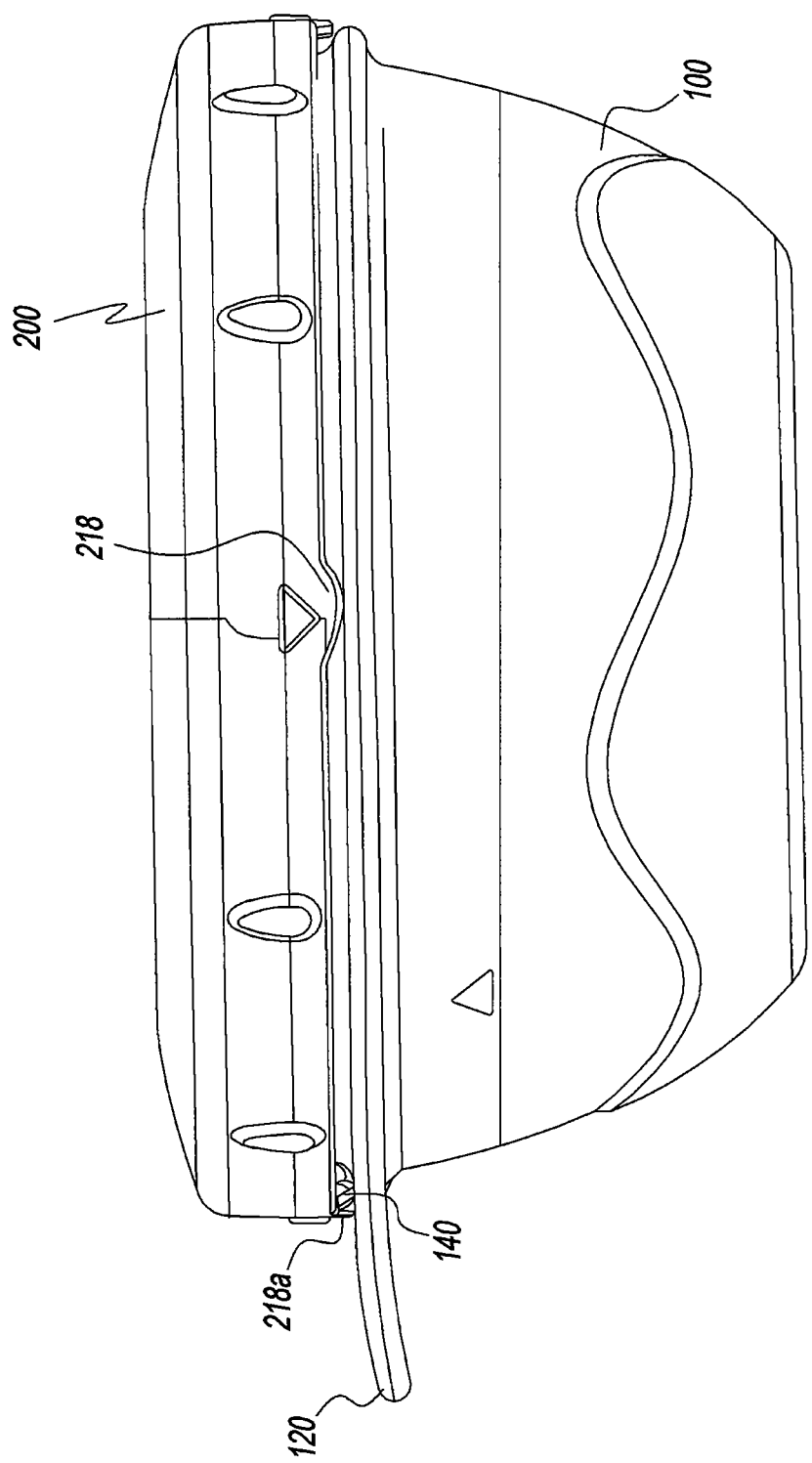
FIG. 8 is a side plan view of the bowl connected to the lid of FIG. 1.

Referring to FIGS. 7-10, to connect lid 200 to bowl 100, a user aligns any one of protrusions 218 with indicator 116. By aligning one protrusion 218 with indicator 116, each lid thread 222 is between two adjacent bowl threads 144, and lid threads 222 are spaced away from bowl threads 144 so that lid 200 may be moved toward bowl 100 until protrusions 218 abut rim 118. Lid 200 may then be rotated. If lid is rotated in a first direction 302, counterclockwise as shown in FIGS. 1-11, each lid thread 222 will abut one stop 148 and further rotation of lid 200 will be prevented. If lid 200 is rotated in a second direction 304, clockwise as shown in FIGS. 1-11, each lid thread 222 will pass under bowl threads 144 so that bowl threads 144 are each between one lid thread 222 and top wall 204. During rotation in second direction 304, one protrusion 218a interferes with ramp 140. The protrusion 218a moves over ramp 140 from a smaller height 140a of ramp 140 on fourth side 156 to a larger height 140b of the ramp on third side 154, as shown by dashed line 157 in FIG. 7. Bowl threads 144 apply a force to lid 200 so that once protrusion 218a has passed over ramp 140, as shown in the solid lines of FIG. 7, lid 200 contacts or "strikes" bowl 100 with such force that an audible sound or "click" is generated. Once protrusion 218a has passed over ramp 140, each lid thread 244 also abuts one stop 148. Tab 128 may also be a resilient material so that the protrusion 218a deflects tab 128 from an initial position moving ramp 140 away from lid 200 through aperture 130. Once protrusion 218a has passed over ramp 140, the resilient material of tab 128 rebounds back to the initial position. The larger height 140b of ramp 140 and stops 148 maintain the protrusion 218a in place adjacent ramp 140, and bowl threads 144 maintain lid 200 connected to bowl 100, as shown in FIG. 7, in a closed position.

Figure 11:
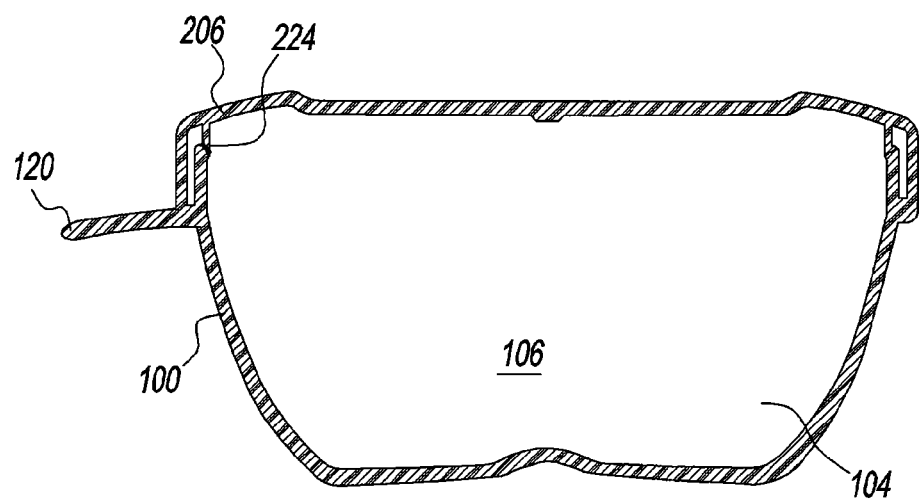
FIG. 11 is a side cross-sectional view of the bowl connected to the lid of FIG. 1.

Referring to FIG. 11, when lid 200 is connected to bowl 100, inner wall 224 abuts inner surface 106 to seal interior volume 104.

When bowl 100 and lid 200 are in the closed position, as shown in FIG. 7, lid 200 can be disconnected from bowl 100 by rotating lid 200 in first direction 302 so that protrusion 218a passes over ramp 140 and either one protrusion 218 aligns with indicator 116 or each lid thread 222 abuts one stop 148 preventing further rotation of lid 200. When one protrusion 218 aligns with indicator 116 or each lid thread 222 abuts one stop 148, each lid thread 222 is between two adjacent bowl threads 144, and lid threads 222 are spaced away from bowl threads 144 so that lid 200 may be moved away from bowl 100 to disconnect lid 200 from bowl 100.

Bowl 100 and lid 200 are ergonomic. Significantly, an audible sound or signal is given when lid 200 is securely connected to bowl 100. This audible sound or signal makes for a practical indicator to the user that the food storage container is securely closed. Clearly, this feature is valuable for the user on the go or at home. Bowl 100 and lid 200 keep food securely contained in interior volume 104 without unwanted spillage. Bowl 100 and lid 200, in comparison to current food storage containers, improves the way food or snacks are transported, and improves the way they are stored at home, by the audible cue and also the visual and tactile indications that the lid is properly closed so that the bowl is sealed. Bowl 100 and lid 200 solve the problem of the unknown improper closure that results in the unwanted spills and leaks during transportation or when the bowl accidentally falls sideways during refrigerator storage.

It should also be recognized that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A storage container, comprising:
a bowl having an open end and a bowl wall forming an interior volume, the bowl wall having a middle portion positioned around an axis of the bowl that extends in a longitudinal direction, the bowl including a rim on an exterior region of the bowl wall extending approximately perpendicular relative to the middle portion of the bowl wall and a plurality of discrete thread-like structures above the rim that generally extend in a circumferential direction, each of the plurality of discrete thread-like structures being separated from an adjacent one of the plurality of discrete thread-like structures by a circumferential space such that none of the plurality of discrete thread-like structures circumferentially overlap each other around the bowl, at least one of the plurality of discrete thread-like structures including a stop structure extending downwardly toward the rim, the bowl further including a tongue that extends outwardly from the rim, the tongue including a connector extending upwardly from an upper surface of the tongue; and
a lid to be placed over the open end of the bowl, the lid including a plurality of lid threads and a downwardly extending protrusion, each of the lid threads passing through one of the circumferential spaces when the lid is placed on the bowl,
wherein rotating the lid and/or the bowl relative to each other in a first direction causes (i) the lid threads to lock under the thread-like structures of the bowl and (ii) the protrusion of the lid to engage the connector and move in the longitudinal direction away from the rim, and wherein rotating the lid relative to the bowl in a second direction opposite the first direction causes at least one lid thread to engage the stop structure of the at least one of the plurality of discrete thread-like structures of the bowl to thereby prevent further rotation in the second direction.

2. The storage container of claim 1, wherein rotating the lid relative to the bowl in the first direction generates an audible signal from the engagement of the protrusion and the connector that indicates the lid and the bowl are properly closed.

3. The storage container of claim 1, wherein the connector has a tab that is cantilevered in an aperture through the rim, and wherein the tab has a first side that connects to the rim and a second side opposite the first side that is free.

4. The storage container of claim 3, wherein the tab has a top surface and a bottom surface, wherein the tab has a ramp that protrudes from the top surface, and wherein the tab has a third side and a fourth side opposite third side so that the ramp increases in height, as measured from the top surface of the tab to a top surface of the ramp, from the fourth side to the third side.

5. The storage container according to claim 3, wherein the lid threads are slanted relative to the longitudinal axis.

6. The storage container of claim 1, wherein the lid has lid wall with a top wall and a side wall that forms a curve with the top wall so that the side wall is perpendicular to the top wall.

7. The storage container of claim 6, wherein the side wall has an exterior surface and an interior surface opposite the exterior surface, and wherein the exterior surface has grippers that protrude from the lid wall.

8. The storage container of claim 1, wherein the thread-like structures on the bowl are slanted relative to the longitudinal axis.

9. The storage container of claim 1, wherein the lid has a lid wall with a top wall and a side wall that forms a curve with the top wall so that the side wall is perpendicular to the top wall, wherein the lid has an inner wall parallel to the side wall having a space therebetween so that when the lid is connected to the bowl, the inner wall abuts an inner surface of the bowl to seal an interior volume of the bowl.

10. The storage container according to claim 1, wherein the lid threads are straight.

11. The storage container according to claim 1, wherein the protrusion is made of a resilient material and rebounds back to an initial position after engaging the connector.

12. The storage container according to claim 1, wherein rotating the lid relative to the bowl in a first direction further causes, after engagement of the protrusion and the connector, (iii) one of the lid threads to engage the stop structure of the at least one of the plurality of discrete thread-like structures of the bowl to thereby prevent further rotation in the first direction.

13. The storage container according to claim 1, wherein the stop structure extends downwardly from at least one of the plurality of discrete thread-like structures and terminates above the rim.

14. The storage container according to claim 1, wherein the plurality of discrete thread-like structures are equally spaced circumferentially around the bowl.

15. The storage container according to claim 1, wherein the plurality of discrete thread-like structures are four in number.

16. The storage container according to claim 1, wherein rotating the lid relative to the bowl in the second direction is for disconnecting the lid and the engagement of the lid thread and the stop structure of the at least one of the plurality of discrete thread-like structures of the bowl indicates that the lid can be disconnected from the bowl by permitting each of the lid threads to passing upwardly through one of the circumferential spaces.

17. A method of connecting a lid to a bowl comprising:
placing the lid over an open end of the bowl;
aligning a first protrusion on the lid with an indicator on the bowl such that a lid thread of the lid is located between two adjacent discrete thread-like structures on the bowl; and
rotating the lid and/or the bowl relative to each other so that a portion of the lid moves in a longitudinal direction away from a rim of the bowl as the portion of the lid passes over a connector of the bowl to a closed position, wherein the bowl has a bowl wall forming a convex shape with a middle portion centered about an axis of the bowl that extends in the longitudinal direction, wherein the rim extends perpendicularly relative to the middle portion of the bowl wall, and wherein the bowl has the connector on the rim.

18. The method of claim 17, wherein the lid thread is spaced away from the two adjacent bowl discrete thread-like structures so that the lid can move toward the bowl until the first protrusion abuts the rim on the bowl.

19. The method of claim 18, wherein rotation of the lid and/or the bowl relative to each other in a first direction is prevented when the lid thread abuts a stop.

20. The method of claim 18, further comprising rotating the lid in a second direction passing the lid thread under one of the two adjacent bowl discrete thread-like structures so that one of the two adjacent bowl threads is between the lid thread and a top wall of the lid.

21. The method of claim 20, wherein the connector has a ramp and the portion of the lid that passes over the connector is a second protrusion, which is the same as or different than the first protrusion, and wherein the rotating of the lid and/or the bowl relative to each other so that the portion of the lid moves in the longitudinal direction away from the rim of the bowl as the portion of the lid passes over the connector of the bowl to the closed position comprises the second protrusion interfering with the ramp during rotation in the second direction.

22. The method of claim 21, further comprising generating at least one of an audible, visual, and tactile signal by the second protrusion moving over the ramp from a smaller height of the ramp to a larger height of the ramp.

23. The method of claim 22, wherein once the second protrusion has passed over the ramp, the lid thread abuts a first stop, and wherein the larger height of the ramp and the first stop maintains the second protrusion in place adjacent the ramp and one of the two adjacent bowl threads maintains the lid connected to the bowl in the closed position.

24. The method of claim 23, wherein when the bowl and the lid are in the closed position, the lid can be disconnected from the bowl by rotating the lid in a first direction so that the second protrusion passes over the ramp and either the first protrusion aligns with the indicator or the lid thread abuts a second stop preventing further rotation of the lid positioning the lid thread between the two adjacent bowl discrete thread-like structures so that the lid can be moved away from the bowl to disconnect the lid from the bowl.

25. A method of connecting a lid to a bowl comprising:
placing the lid over an open end of the bowl;
aligning the lid with the bowl such that a lid thread of the lid is located between two adjacent bowl thread-like structures of the bowl; and
rotating the lid and/or the bowl relative to each other so that a portion of the lid moves in a longitudinal direction away from a rim of the bowl as a first protrusion of the lid passes over a connector of the bowl to a closed position, wherein the bowl comprises: a bowl wall forming a convex shape with a middle portion centered about an axis of the bowl that extends in the longitudinal direction, wherein the rim extends perpendicularly relative to the middle portion; a tongue extending outwardly from the rim, the tongue including the connector extending upwardly from an upper surface of the tongue, wherein the first protrusion extends downwardly from the lid.

\* \* \* \* \*